INVENTORS
WALTER POHL
LUDWIG KNOOP
BY
ATTORNEY

March 29, 1960 W. POHL ET AL 2,930,679
CATALYTIC REACTOR WITH QUENCH COOLER
Filed Feb. 21, 1956 2 Sheets-Sheet 2

INVENTORS
WALTER POHL
LUDWIG KNOOP
BY

ATTORNEY

2,930,679

CATALYTIC REACTOR WITH QUENCH COOLER

Walter Pohl, Leuna, and Ludwig Knoop, Bad Duerrenberg, Germany, assignors to VEB Leuna-Werke Walter Ulbricht, Leuna, Germany Application February 21, 1956, Serial No. 566,989

3 Claims. (Cl. 23—288)

This invention relates to catalytic oxidation processes and apparatus for carrying out such processes.

It is an object of this invention to provide a method for cooling in a simple and efficient manner the hot reaction gases obtained during such processes.

A further object of this invention is to provide a method for the purpose referred to, by means of which the hot reaction gases are cooled without necessitating elaborate and expensive coolers and without the risk of possible blockage and clogging of the reaction furnace due to the formation of solid decomposition products.

A still further object of the invention is the provision of a contact furnace for use in catalytic oxidation processes having means for efficiently cooling the hot reaction gases formed during the processes within the furnace proper.

Finally, it is an object of this invention generally to improve on methods and apparatus for catalytic oxidation as now customarily carried out and constructed, respectively. In carrying out catalytic oxidation processes, it is, as a rule, important that the reaction gases leaving the catalyst-containing contact zone are quickly cooled, so as to prevent undesired decomposition. For the purpose of thus cooling the hot reaction gases, the contact furnace is usually communicating with a water-cooled cooler.

Such coolers are necessarily of relatively large size and thus are expensive.

The use of such coolers results in a further important drawback, in case the reaction gases on decomposition form solid substances, for example cracking products. In that case, these solid substances are inclined to deposit on, and thus cover, the inner walls of the cooler, which fact results in a decreased heat exchange and thus a reduced cooling effect. Moreover, the deposition of the solid substances on the walls may proceed to such an extent that it results in the blocking and clogging of the entire apparatus.

In accordance with the method of this invention to be described below, wherein the hot reaction gases are cooled directly and indirectly, these drawbacks are entirely overcome.

Two embodiments of the inventive furnace, in which the method of this invention may advantageously be carried out, are illustrated in the accompanying drawings, in which Fig. 1 is a schematic, elevational view of a first embodiment of a contact furnace;

Figure 1:
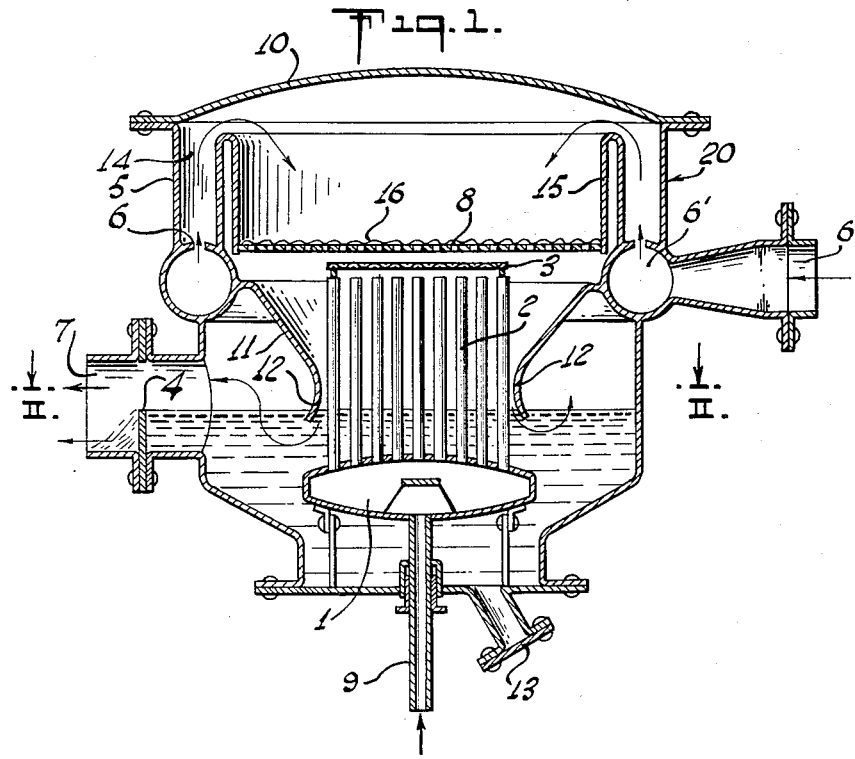
Figure 2:
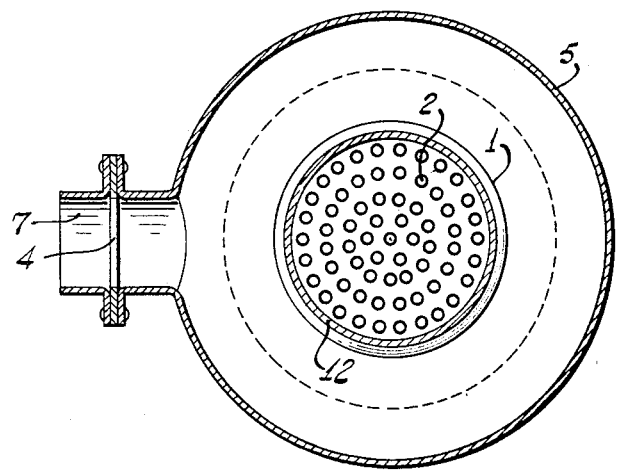
Fig. 2 is a corresponding plan view taken on line II—II of Fig. 1.

Referring now to the drawings, and in particular to Figs. 1 and 2, reference numeral 20 generally indicates a contact furnace having a shaped casing 5 with lateral inlet 6 ending in a horizontal annular tube 6' provided with a slot 6" along its top surface. The slot 6" opens into a ring space 14 between the outer wall of the casing 5 and an inner cylindrical wall portion 15 which extends from the tube 6' upwards and ends a distance below the cover 10 of the casing 5. An electric heating device (not shown) may be located in the ring space 14. A sieve plate 8, carrying a thin layer of a catalyst 16, is arranged within the cylindrical wall portion 15 at the lower end thereof. A supply pipe 9 passes through the bottom of the casing 5 in leakage-proof manner and communicates with a substantially flat receptacle 1 of circular outline, which is located in the casing 5 an appreciable distance below the sieve plate 8. A plurality of pipes 2 arranged on concentric circles project upwards from the top of the receptacle 1 and communicate with the interior of the latter. The upper open ends of the pipes 2 are spaced a relatively short distance from the sieve plate 8. A wire screen 3 is arranged between the top plane of the pipes 2 and the sieve plate 8. The casing 5 is provided with an interior, downwardly tapering insert portion 11, the narrowest zone 12 of which surrounds the outermost pipes 2 with little clearance. The casing 5 is moreover provided with a normally closed bottom outlet 13 and an overflow weir 4 arranged in a permanently open lateral outlet 7. Heating means (not shown) are provided for heating the furnace.

The furnace here described works as follows:

The furnace is charged through inlet 6 with a reactant as e.g. vapors of methyl cyclohexanol mixed with hot air, to be processed by catalytic oxidation. The mixture passes through tube 6' and enters the space 14 where it may be heated by the mentioned device. From space 14 the vapor mixture enters the contact space interiorly of the cylindrical wall 15 from above and passes on downward as indicated by the arrows in Fig. 1, and through the catalyst-containing reaction zone embodied by the sieve plate 8 into the insert portion 11 with a correspondingly high temperature. The reaction product or products thus obtained wash around the pipes 2. They pass between the zone 12 of the insert portion 11 and the pipes 2 into the bottom part of the casing 5, whereafter they leave the furnace through outlet 7. The shape and dimensions of the member 11, 12, result in a particularly good contact between the hot gaseous reaction products and the pipes 2.

With a view to efficiently cooling the reaction gases substantially immediately after their leaving the reaction zone, a liquid, for example water—in case this does not interfere with the reaction proper—or liquid reaction product obtained in the process is pumped by a pump (not shown) through the supply pipe 9 into the receptacle 1 and from there into the pipes 2. The liquid slowly rises in the pipes, where it is heated by the heat exchange with the downwardly flowing hot reaction gases so as to leave the pipes in a boiling or more or less evaporated condition. The boiling or evaporated liquid passes through the open top ends of the pipes 2, whereby the reaction gases passing through the sieve plate 8 and meeting that liquid are subjected to a first rapid cooling. The wire screen 3 protects the sieve plate 8, carrying the catalyst, from splashing. Boiling liquid flowing down on the outsides of the pipes 2 causes a further cooling due to its evaporation. That part of the liquid which has not evaporated flows down into the lower part of the casing 5, where it collects. The collecting liquid is dammed up by the weir 4, and thus forms a liquid surface on which the reaction gases are additionally cooled before leaving the furnace through the lateral outlet 7. The separation of the cooled gases from the cooling liquid can be accomplished by any suitable and conventional means and method. In case the reaction gases form and separate solid substances, the latter are flushed down by the liquid into the bottom part of the casing, wherefrom they can be drawn off through the bottom outlet 13.

It will be realized that due to the direct and indirect cooling of the hot reaction gases, i.e. by the vapors or steam and by the liquid passing through the pipes 2 and even by the dammed up liquid collecting in the bottom part of the casing 5, a very efficient cooling is obtained.

The cooling of the reaction gases by the vapors or steam and the liquid passing through the pipes 2 is particularly efficient, since it is in fact a counter-current cooling, whereby particularly intimate contact is obtained.

The length of the pipes 2 can of course be adapted to the particular requirements, and, if desired, the length may be so chosen that the liquid evaporates completely.

Figure 3:
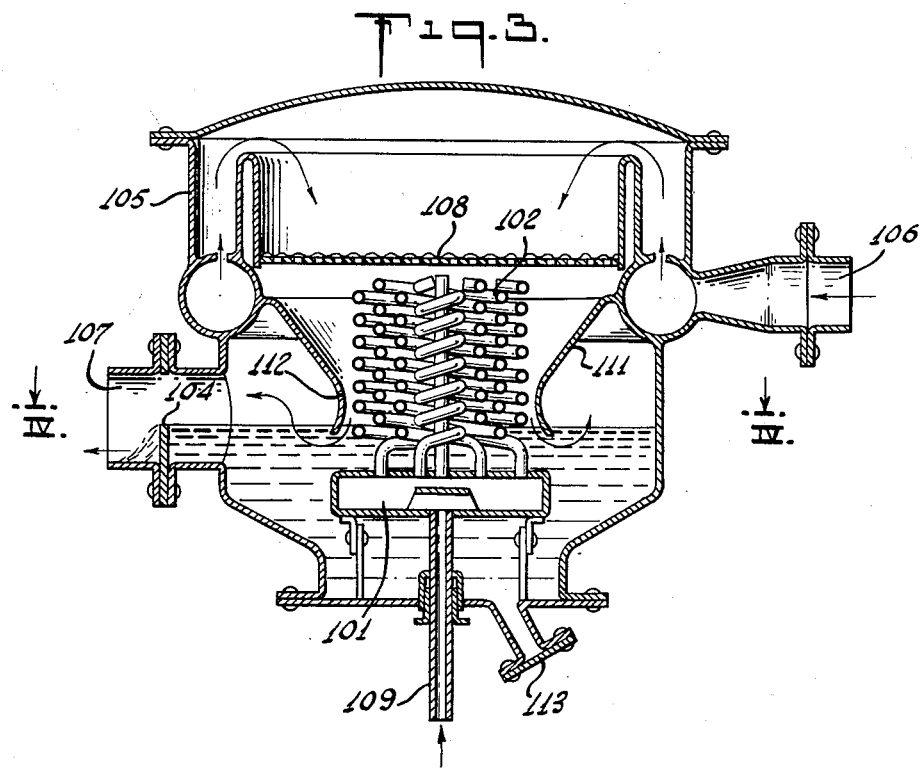
Fig. 3 is a schematic, elevational view of a second embodiment of a contact surface.
Figure 4:
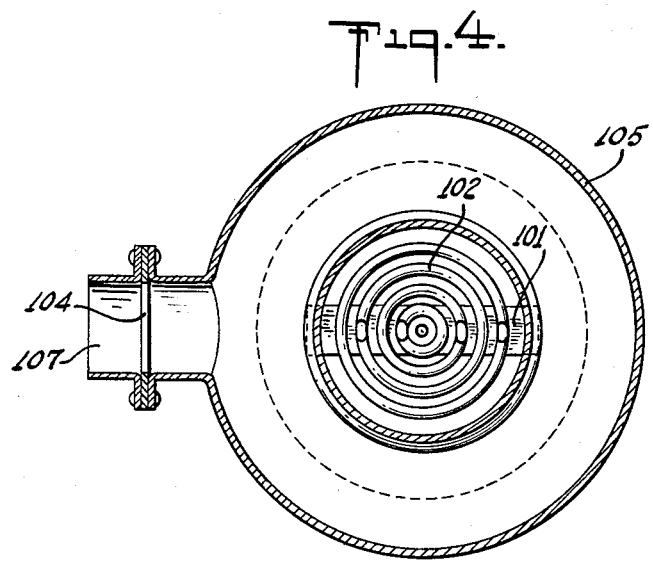
Fig. 4 is a corresponding plan view on line IV—IV of Fig. 3.

The embodiment of the contact furnace shown in Figs. 3 and 4 is substantially similar to that shown in Figs. 1 and 2. Reference numeral 105 indicates a shaped casing with lateral inlet 106 and lateral outlet 107. A sieve plate 108 carrying a catalyst, is arranged within the upper part of the casing 105. A supply pipe 109 passing through the bottom of the casing 105 in leakage-proof manner communicates with a receptacle 101. It will be realized that the embodiment of Figs. 3 and 4 up to this point is like that of Figs. 1 and 2, although the receptacle 101 is shaped in a different manner. However, the plurality of open pipes 2 of the first embodiment is replaced in the second embodiment by several pipe coils 102, each of which communicates with the receptacle 101 and has an open top end terminating below the sieve plate 108. The number of pipe coils is adapted to the particular requirements. As in the first embodiment, the casing 105 is provided with an interior, downwardly tapering insert portion 111, the narrowest zone 112 of which surrounds the outermost pipe coils 102 with little clearance. The casing 105 is also provided with a bottom outlet 113 and an overflow weir or damming device 104 arranged in the lateral outlet 107. Heating means (not shown) are provided for heating the furnace. The operation of the furnace illustrated in Figs. 3 and 4 is identical with that of Figs. 1 and 2, and further explanations in this respect are thus deemed unnecessary.

The method of this invention will now be described by an example, but it should be understood that this example is given by way of illustration rather than by way of limitation, and that many variations may be made in, for example, the choice of reactant and reaction conditions in general, without departing in any way from the spirit of the invention.

*Example*

Methyl cyclohexanol is oxidized with air in a contact furnace corresponding to that shown in the drawings (Figs. 1 and 2) to yield methyl cyclohexanon. Silver is used as catalyst. The furnace is fitted with a bunch of 66 copper pipes, each having an inner diameter of 21 millimeters, an outer diameter of 25 millimeters, and an average length of 377 millimeters. The wall thickness of the pipes is thus 2 millimeters. The bottom part of the furnace has a diameter of 900 millimeters, the height amounts to 500 millimeters. The catalyst is spread out over an area of 0.407 square meter. The hourly ratio is 605 kilograms of methyl cyclohexanol and 310 standard cubic meters of air. The temperature of the reaction gases leaving the contact zone is about 630° C. 450 liters/hour of water are continuously supplied to the pipes, whereby the reaction gases are cooled down to about 100° C. This water is drawn off from the reaction product formed during the process. The solid cracking products formed in small quantities during the process are, at the same time, flushed down into the bottom part of the furnace. With a view to maintaining the catalytic process continuously, the cracking products are drawn off as sludge through the bottom outlet of the furnace about every five days.

What we claim is:

1. A device for rapidly cooling hot reaction gases formed by a catalytic reaction comprising an enclosure having fluid inlet and outlet means, a perforated partition contained within said enclosure and dividing said enclosure into inlet and outlet sides, said partition being disposed across said enclosure and adapted to support a catalyst bed thereon, said fluid inlet means being adapted to conduct reaction gases into said enclosure and through said partition, said fluid outlet means being adapted to convey fluid out from said outlet side of said enclosure, cooling means disposed in the outlet side of said enclosure and substantially immediately adjacent to said partition, said cooling means comprising a plurality of closely spaced cooling medium carrying conduits each having an open end located substantially immediately adjacent said partition, fluid guide means contained within said enclosure and surrounding said conduits and adapted to direct reaction gases discharging through said partition toward the outside wall surfaces of said conduits, and means for supplying cooling fluid to said conduits, said conduits being spaced from each other and disposed substantially throughout their length in the path of the hot vapors discharging through said partition, whereby said hot vapors are caused to pass between said conduits and contact their outside surfaces to be cooled thereby and whereby fluid vaporized in said conduits is caused to issue at their open ends and contact hot gases discharging through said partition.

2. A device according to claim 1 wherein said fluid guide means comprises a funnel-shaped guide means which encompasses said plurality of closely spaced cooling medium carrying conduits.

3. A device according to claim 1 wherein said fluid outlet means is disposed above the supply end of said conduits.

References Cited in the file of this patent

UNITED STATES PATENTS

| | | |
|---|---|---|
| 1,959,898 | Brode et al. | May 22, 1934 |
| 2,256,622 | Murphree et al. | Sept. 23, 1941 |
| 2,585,462 | Hirsch | Feb. 12, 1952 |
| 2,744,730 | Merritt | May 8, 1956 |
| 2,793,939 | Haltmeier | May 28, 1957 |